US012786979B2

(12) United States Patent
Li

(10) Patent No.: US 12,786,979 B2
(45) Date of Patent: Nov. 3, 2026

(54) BEAM APPLICATION METHOD AND APPARATUS

(71) Applicant: Beijing Xiaomi Mobile Software Co., Ltd., Beijing (CN)

(72) Inventor: Mingju Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 313 days.

(21) Appl. No.: 18/294,387

(22) PCT Filed: Aug. 5, 2021

(86) PCT No.: PCT/CN2021/111038
§ 371 (c)(1),
(2) Date: Feb. 1, 2024

(87) PCT Pub. No.: WO2023/010473
PCT Pub. Date: Feb. 9, 2023

(65) Prior Publication Data

US 2024/0340878 A1 Oct. 10, 2024

(51) Int. Cl.
*H04W 72/044* (2023.01)
*H04W 72/232* (2023.01)

(52) U.S. Cl.
CPC ....... *H04W 72/046* (2013.01); *H04W 72/232* (2023.01)

(58) Field of Classification Search
CPC . H04W 72/046; H04W 72/232; H04W 72/04; H04W 72/23; H04W 72/0446; H04W 72/1263; H04L 5/0023; H04L 5/0053; H04L 5/0094; H04L 5/001; H04L 5/0048; H04L 5/0091; H04L 27/26025; H04B 7/06952
See application file for complete search history.

(56) References Cited

U.S. PATENT DOCUMENTS

| | | | | |
|---|---|---|---|---|
| 11,202,308 | B2 * | 12/2021 | Venugopal | H04W 72/23 |
| 12,401,467 | B2 * | 8/2025 | Bai | H04L 5/0094 |
| 2022/0061056 | A1 * | 2/2022 | Farag | H04B 7/0639 |
| 2024/0031111 | A1 * | 1/2024 | Yao | H04B 7/0665 |
| 2024/0172223 | A1 * | 5/2024 | Yuan | H04W 72/02 |
| 2024/0187178 | A1 * | 6/2024 | Matsumura | H04L 5/0091 |

(Continued)

FOREIGN PATENT DOCUMENTS

CN 112771814 A 5/2021

OTHER PUBLICATIONS

ZTE, "Enhancements on Multi-beam Operation", 3GPP TSG RAN WG1 Meeting #102-e, R1-2005454, e-Meeting, Aug. 17-28, 2020, 11 pages.

(Continued)

*Primary Examiner* — Will W Lin

(74) *Attorney, Agent, or Firm* — Finnegan, Henderson, Farabow, Garrett & Dunner, L.L.P.

(57) ABSTRACT

A method for beam application is performed by a terminal device, and includes: receiving downlink control information (DCI) from a network device, wherein the DCI comprises a unified transmission configuration indication (TCI) state; and determining at least one of a beam application time for uplink (UL) transmission or a beam application time for downlink (DL) transmission corresponding to the unified TCI state.

11 Claims, 2 Drawing Sheets

(56) References Cited

U.S. PATENT DOCUMENTS

| | | | | |
|---|---|---|---|---|
| 2024/0214173 | A1* | 6/2024 | Matsumura | H04L 5/001 |
| 2025/0105977 | A1* | 3/2025 | Liu | H04L 5/0048 |

OTHER PUBLICATIONS

Extended European Search Report issued in Application No. 21952357.8 dated Sep. 10, 2024, 10 pages.

Notice of Reasons for Refusal issued by the Japanese Patent Office on Jan. 21, 2025, in corresponding Application No. JP 2024-507035, 8 pages.

"Further enhancement on multi-beam operation", Sony, 3GPP TSG-RAN WG1 #105 e-Meeting, R1-2105151, May 10-27, 2021, 22 pages.

International Search Report and Written Opinion of International Application No. PCT/CN2021/111038, dated Apr. 27, 2022, 16 pages.

ZTE, "Enhancements on Multi-beam Operation", 3GPP TSG RAN WG1 Meeting #104b-e, R1-2102660, e-Meeting, Apr. 12-20, 2021, 25 pages.

Sony, "Further enhancement on multi-beam operation", 3GPP TSG RAN WG1#104bis, R1-2103287, E-meeting, Apr. 12-20, 2021, 20 pages.

Vivo, "Further discussion on multi beam enhancement", 3GPP TSG RAN WG1 #105-e, R1-2104343, e-Meeting, May 10-27, 2021, 33 pages.

ZTE, "Enhancements on Multi-beam Operation", 3GPP TSG RAN WG1 Meeting #105-e, R1-2104585, Meeting, May 10-27, 2021, 24 pages.

* cited by examiner

BEAM APPLICATION METHOD AND APPARATUS

CROSS-REFERENCE TO RELATED APPLICATION

This application is the U.S. National Stage Application of International Application No. PCT/CN2021/111038, filed on Aug. 5, 2021, the entire disclosure of which is incorporated herein by reference.

TECHNICAL FIELD

The disclosure relates to a field of communication technologies, and particularly to a method and an apparatus for beam application.

BACKGROUND

In wireless communication, beams corresponding to a physical downlink control channel (PDCCH), a physical downlink share channel (PDSCH), a physical uplink control channel (PUCCH), a physical uplink share channel (PUSCH) and/or a reference signal (RS) are usually indicated. The PDCCH and PUCCH may use a medium access control (MAC) control element (CE) to activate or apply a beam. The PDSCH and PUSCH may use a downlink control information (DCI) signaling to indicate or apply their respective beams. This may cause a deviation between beams of a network device and a terminal device.

SUMMARY

In a first aspect, a method for beam application is provided according to an embodiment of the disclosure, which is applied to a terminal device. The method includes: receiving DCI from a network device, in which the DCI includes a unified transmission configuration indication (TCI) state; and determining a beam application time for UL transmission and/or a beam application time for DL transmission corresponding to the unified TCI state.

In a second aspect, a method for beam application is provided according to an embodiment of the disclosure, which is applied to a network device. The method includes: sending DCI to a terminal device, in which the DCI includes a unified TCI state; and applying a beam according to the DCI.

In a third aspect, a terminal device is provided according to an embodiment of the disclosure. The terminal device includes: a processor and a memory storing computer programs executable by the processor. The processor is configured to perform: receiving DCI from a network device, in which the DCI includes a unified transmission configuration indication (TCI) state; and determining a beam application time for UL transmission and/or a beam application time for DL transmission corresponding to the unified TCI state.

BRIEF DESCRIPTION OF THE DRAWINGS

The accompanying drawings of the disclosure will be briefly described below.

DETAILED DESCRIPTION

To facilitate understanding, the terminology involved in this disclosure is first introduced.

1. Downlink Control Information (DCI)

The DCI is carried in a PDCCH. The DCI may include uplink (UL) and downlink (DL) resource assignment, hybrid automatic repeat request (HARQ) information, power control, etc. The PDCCH is a kind of physical channel to carry the DCI.

2. Beam Indication

In release 16 (Rel-16), beams corresponding to the PDCCH, PDSCH, PUCCH, PUSCH and/or RS etc. may be indicated.

The RS includes a channel state information reference signal (CSI-RS), a sounding reference signal (SRS), a positioning reference signal (PRS), a tracking reference signal (TRS), etc. The CSI-RS includes a CSI-RS used for channel state information measurement, or a CSI-RS used for beam measurement, or a CSI-RS used for pathloss estimation. The SRS includes a SRS used for channel state information measurement based on codebook or non-codebook, or a SRS used for beam measurement, or a SRS used for positioning measurement.

The beam described herein is also called a transmission configuration indicator (TCI) state. The TCI state contains Quasi Co-location (QCL) Type D information. The beam application time described herein is also called an application time of the TCI state.

In order to better understand a method for beam application in the embodiment of the disclosure, a communication system to which the embodiments of the disclosure are applicable is first described below.

Figure 1:
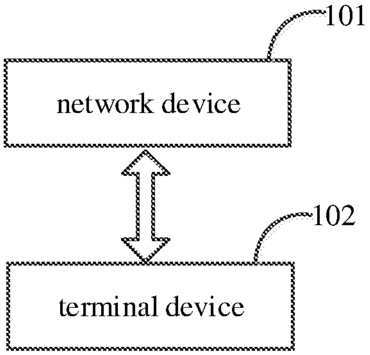
FIG. 1 an architectural diagram of a communication system according to an embodiment of the disclosure.

Referring to FIG. 1, it is an architectural diagram of a communication system according to an embodiment of the disclosure. The communication system may include but is not limited to one network device and one terminal device. The number of devices and the device form shown in FIG. 1 are only as examples and do not constitute a limitation on the embodiments of the disclosure. In actual applications, the system may include two or more network devices, and two or more terminal devices. The communication system shown in FIG. 1 includes one network device 101 and one terminal device 102 as an example.

It should be noted that the technical solutions of the embodiments of the disclosure may be applied to various communication systems, for example, a long term evolution (LTE) system, a 5th generation (5G) mobile communication system, a 5G new radio (NR) system, or other future new mobile communication system. It should also be noted that a side link in the embodiment of the disclosure may also be called a sidelink or a direct communication link.

The network device 101 in the embodiment of the disclosure is an entity at a network side that is used to transmit or receive signals. For example, the network device 101 may be an evolved NodeB (eNB), a transmission reception point (TRP), a next generation NodeB (gNB) in an NR system, or other base stations in a future mobile communication system, or an access node in a wireless fidelity (WiFi) system, etc. The embodiments of the disclosure do not limit the specific technology and specific device form used by the network device. The network device according to the embodiment of the disclosure may be composed of a centralized unit (CU) and a distributed unit (DU). The CU may also be called a control unit. The CU-DU structure may be used to separate protocol layers of the network device (such as base station), functions of some protocol layers are placed in the CU for centralized control and functions of all protocol layers or the remaining protocol layers are distributed in the DU so that the CU centrally controls the DU.

The terminal device 102 in the embodiment of the disclosure is an entity at a user side that is used to receive or transmit signals, such as a mobile phone. The terminal device may also be called a terminal, a user equipment (UE), a mobile station (MS), a mobile terminal (MT), etc. The terminal device may be a car with communication functions, a smart car, a mobile phone, a wearable device, a Pad, a computer with wireless transceiver functions, a virtual reality (VR) terminal device, an augmented reality (AR) terminal device, a wireless terminal device in industrial control, a wireless terminal device in self-driving, a wireless terminal device in remote medical surgery, a wireless terminal device in a smart grid, a wireless terminal device in transportation safety, a wireless terminal device in smart city, a wireless terminal device in smart home, etc. The embodiments of the disclosure do not limit the specific technology and specific device form used by the terminal device.

In Rel-16, the beams corresponding to the PDCCH, PDSCH, PUSCH, PUCCH and/or RS are independently indicated. The reference signal includes a CSI-RS, a SRS, a PRS, a TRS, etc. The CSI-RS includes a CSI-RS for channel state information measurement or a CSI-RS for beam measurement or a CSI-RS for pathloss estimation. The SRS includes a SRS for channel state information measurement based on codebook or non-codebook, a SRS for beam measurement, or a SRS for positioning measurement. The PDCCH and PUCCH use the MAC CE to activate a beam. The PDSCH and PUSCH indicate their respective beams based on the DCI signaling. Currently, in order to reduce the signaling overhead, one possible method is to use a common beam. Currently, the common beam may be indicated independently by a separate UL TCI state for UL transmission and an separate DL TCI state for DL transmission, or may be indicated by an joint TCI state for UL and DL transmission. That is, if the base station indicates a common beam for DL, then the common beam for DL may be used for the PDSCH and the partial/all PDCCH of the terminal device (such as, UE dedicated PDCCH). If the base station indicates a common beam for UL, then the common beam for UL may be used for the PUSCH and the partial/all PUCCH of the terminal.

Currently, there is a lack of effective means for beam application. It is proposed that the unified TCI state indicated by the DCI may be used after T time when a Hybrid Automatic Repeat Request (HARQ) acknowledgment character (ACK) feedback for the DCI is sent. That is, there are T time between the beam application time and a time point of sending the HARQ ACK feedback. However, there is currently a lack of a method for determining the beam application time during cross-carrier indication, and it is impossible to ensure that the beams of the network device and the terminal device are consistent during the cross-carrier indication.

It may be understood that, the communication system described in the embodiments of the disclosure is to more clearly illustrate the technical solutions of the embodiments of the disclosure, and does not constitute a limitation on the technical solutions according to the embodiments of the disclosure. Those skilled in the art may know that with the evolution of system architecture and the emergence of new service scenarios, the technical solutions according to the embodiments of the disclosure are also applicable to similar technical problems.

The method and apparatus for beam application according to the disclosure will be introduced in detail below with reference to the accompanying drawings.

Figure 2:
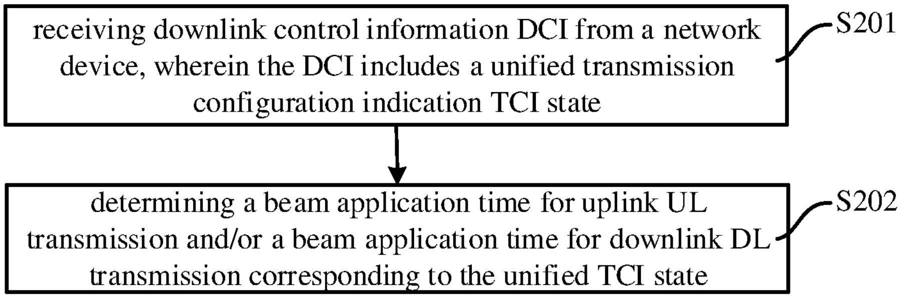
FIG. 2 is a flowchart illustrating a method for beam application according to an embodiment of the disclosure.

Referring to FIG. 2, it is a flowchart illustrating a method for beam application according to an embodiment of the disclosure. The method is applied to a terminal device. As shown in FIG. 2, the method may include but is not limited to the following steps.

At S201, DCI is received from a network device. The DCI includes a unified TCI state.

In the embodiment of the disclosure, the beam is indicated according to the unified TCI state or the common TCI state in the DCI, and the beam may be a common beam. After the terminal device receives the unified TCI state or the common TCI state in the DCI, the terminal may apply the beam.

At S202, a beam application time for UL transmission and/or a beam application time for DL transmission corresponding to the unified TCI state is determined.

In the embodiment of the disclosure, the beam application time is a time point of starting to apply the beam. In order to ensure the communication quality, the beam application time for the network device needs to be consistent with that for the terminal device. After the unified TCI state in the DCI is received, the beam application time for UL transmission and/or the beam application time for DL transmission corresponding to the unified TCI state may be determined.

Alternatively, the beam application time is a time point of starting to apply the beam. In order to ensure the communication quality, the beam application time for the network device needs to be consistent with that for the terminal device. After the unified TCI state in the DCI is received, the beam application time for DL transmission corresponding to the unified TCI state may be determined.

Through the embodiment of the disclosure, it is achieved that the corresponding beam application time for UL transmission and/or the corresponding beam application time for DL transmission is determined according to the DCI, and beam application is performed. This ensures a consistency between beams of the network device and beams of the terminal device, and improves a transmission performance.

Optionally, the DCI contains or does not contain DL assignment indication information.

The DCI may include the DL assignment indication information which is used to indicate a time-frequency resource of the PDSCH; or the DCI may not include the DL assignment indication information.

Optionally, the beam application time for UL transmission and/or the beam application time for DL transmission is after a transmission time of a hybrid automatic repeat request (HARQ) acknowledgment character (ACK) feedback for the DCI, with a plurality of symbols therebetween. The beam application time for UL transmission and/or the beam application time for DL transmission is an application time of the unified TCI state.

In the embodiment of the disclosure, the HARQ is a technology that combines forward error correction (FEC) and automatic repeat request (ARQ). The basic principle of HARQ is as follows. The FEC technology is used at a receiving end to correct a part of errors in all the errors that may be corrected; error detection is performed and data packets that cannot be corrected are determined; the data packets that cannot be corrected are discarded; and a sending end is requested to resend same data packs. The HARQ ACK is feedback information sent by receiving end to the sending end. The terminal device is a receiving end, and the beam application time is a time point spacing a plurality of symbols after the time point when the terminal device sends the HARQ ACK to the network device.

Through the embodiments of the disclosure, it is achieved that the corresponding beam application time for UL transmission and/or the corresponding beam application time for DL transmission is determined according to transmission time of the HARQ ACK feedback for the DCI. This ensures the consistency between beams of the network device and beams of the terminal device, and improves the transmission performance.

Optionally, the plurality of symbols is a first number of symbols, and the first number of symbols are determined based on a subcarrier space of the DL transmission, in which the beam application time is the beam application time for DL transmission; and/or the plurality of symbols is a second number of symbols, and the second number of symbols are determined based on a subcarrier space of the UL transmission, in which the beam application time is the beam application time for UL transmission.

In the embodiment of the disclosure, the beam application time is after the transmission time of the HARQ ACK feedback, with the first number of symbols therebetween, the first number of symbols are determined based on the sub-carrier space (SCS) of DL transmission, in which the symbols are time symbols and the beam application time is the beam application time for DL transmission; and/or the beam application time is after the transmission time of the HARQ ACK feedback, with the second number of symbols therebetween, the second number of symbols are determined based on the SCS of the UL transmission, in which the symbols are time symbols, and the beam application time is the beam application time for UL transmission.

Optionally, the first number of symbols are determined based on the SCS of the DL transmission, which means that a time length occupied by each symbol is determined based on the SCS of the DL transmission. For example, if the SCS of the DL transmission is 15 KHz, a time length occupied by each slot is Tms, and if a slot contains N symbols, the time length occupied by each symbol is 1/14 ms, where the value of The value of N is 12 or 14. For another example, if the SCS of the DL transmission is 30 KHz, the time length occupied by each slot is 0.5 ms, and if a slot contains N symbols, the time length occupied by each symbol is 1/28 ms, where the value of The value of N is 12 or 14.

Optionally, the second number of symbols are determined based on the SCS of the UL transmission, which means that a time length occupied by each symbol is determined based on the SCS of the UL transmission. For example, if the SCS of the UL transmission is 15 KHz, a time length occupied by each slot is Tms, and if a slot contains N symbols, the time length occupied by each symbol is 1/14 ms, where the value of The value of N is 12 or 14. For another example, if the SCS of the UL transmission is 30 KHz, the time length occupied by each slot is 0.5 ms, and if a slot contains N symbols, the time length occupied by each symbol is 1/28 ms, where the value of The value of N is 12 or 14.

Optionally, the first number of symbols and/or the second number of symbols are configured by the network device. The value of the first number and the value of the second number may be the same or different.

Through the embodiment of the disclosure, it is achieved that the first number of symbols and/or the second number of symbols are determined according to the SCS, and the corresponding beam application time for UL transmission time and the corresponding beam application time for DL transmission are determined according to the symbol numbers and the transmission time of the HARQ ACK feedback. This ensures the consistency between beams of the network device and beams of the terminal device, and improves the transmission performance.

Optionally, a time length for the plurality of symbols is a first time value; or the plurality of symbols are a third number of symbols, in which the third number of symbols are determined based on a SCS of the UL transmission or a SCS of the DL transmission, and the beam application time is the beam application time for UL transmission and DL transmission.

In the embodiment of the disclosure, the time length for the plurality of symbols may be the first time value, and the first time value is an absolute time value, rather than the number/quantity of the symbols. That is, the beam application time is after the transmission time of the HARQ ACK feedback, with the first time value therebetween. The specific numerical value of the first time value may be adjusted by an implementer according to an actual implementation situation, which is not limited in the disclosure. In a possible implementation, the first time value is configured by the network device. The beam application time is the beam application time for UL transmission and DL transmission. That is, regardless of specific numerical values for the SCS of the UL transmission and the SCS of the DL transmission, both UL transmission and DL transmission adopt the TCI state indicated by the DCI after the first time.

Alternatively, the beam application time is after the transmission time of the HARQ ACK feedback, with the third number of symbols therebetween. The third number of symbols are determined based on the SCS of the UL transmission or the SCS of the DL transmission, where the symbols are time symbols, and the beam application time is the beam application time of the UL transmission or the beam application time for DL transmission. That is, one of the SCS of the UL transmission and the SCS of the DL transmission is used to determine a time length occupied by the third number of symbols. In this case, if the SCS of the UL transmission is different from the SCS of the DL transmission, both UL transmission and DL transmission may also adopt the TCI state indicated by DCI after the same time value.

Optionally, the value of the third number is configured by the network device, in which the third number of symbols are determined based on the SCS of the UL transmission or the SCS of the DL transmission, which means that the time length occupied by each symbol in the third number of symbols is determined by the SCS of the UL transmission or the SCS of the DL transmission.

Through the embodiment of the disclosure, it is achieved that the third number of symbols are determined according to the SCS of the UL transmission or the SCS of the DL transmission, and the corresponding beam application time for UL transmission and/or the beam application time for DL transmission is determined according to the symbol number and the transmission time of the HARQ ACK feedback; or the corresponding beam application time for UL transmission and/or the beam application time for DL transmission is determined according to the first time value and the transmission time of the HARQ ACK feedback. This ensures the consistency between beams of the network device and beams of the terminal device, and improves the transmission performance.

Optionally, the DCI and the UL transmission and/or DL transmission correspond to a component carrier of the same carrier. That is, the DCI is used to indicate the TCI state of the UL transmission and/or DL transmission on the same carrier. Alternatively, the DCI and the UL transmission and/or the DL transmission correspond to component carriers of different carriers, and a SCS corresponding to the DCI is greater than or equal to a SCS of the UL transmission and/or a SCS of the DL transmission. That is, the DCI is used to indicate the TCI state of UL transmission and/or DL transmission on different carriers.

Optionally, the plurality of symbols include a fourth number of symbols and a fifth number of symbols, in which the fourth number of symbols are determined based on a SCS of the DL transmission, the fifth number of symbols are determined based on a SCS of the DCI and a SCS of the DL transmission, and the beam application time is the beam application time for DL transmission; and/or the plurality of symbols include a sixth number of symbols and a seventh number of symbols, in which the sixth number of symbols are determined based on a SCS of the UL transmission, the seventh number of symbols are determined based on a SCS of the DCI and a SCS of the UL transmission, and the beam application time is the beam application time for UL transmission.

In the embodiment of the disclosure, when the DCI and the DL transmission correspond to component carriers of different carriers and the SCS corresponding to the DCI is smaller than the SCS of the DL transmission, then the terminal device cannot process data in time and thus needs additional delays (i.e. additional symbols); the additional number of symbols are determined after determining the fourth number of symbols based on the SCS of the DL transmission; the additional number of symbols are proportional to the SCS of the DL transmission and inversely proportional to the SCS of the DCI; the additional number of symbols are the fifth number of symbols; the plurality of symbols include the fourth number of symbols and the fifth number of symbols, and the beam application time is after the transmission time of the HARQ ACK feedback, with a sum of the fourth number of symbols and the fifth number of symbols therebetween, in which the symbols are time symbols, and the beam application time is the beam application time for DL transmission; and/or when the DCI and the UL transmission correspond to component carriers of different carriers and the SCS corresponding to the DCI is smaller than the SCS of the UL transmission, then the terminal device cannot process data in time and thus needs additional delay (i.e., additional symbols); the additional number of symbols are determined after determining the sixth number of symbols based on the SCS of the UL transmission; the additional number of symbols are proportional to the SCS of the UL transmission and inversely proportional to the SCS of the DCI; the additional number of symbols are the seventh number of symbols; the beam application time is after the transmission time of the HARQ ACK feedback, with a sum of the sixth number of symbols and the seventh number of symbols therebetween, in which the symbols are time symbols, and the beam application time is the beam application time for UL transmission.

Optionally, the fourth number of symbols are determined based on the SCS of the DL transmission, which means that a time length occupied by each symbol is determined based on the SCS of the DL transmission. For example, if the SCS of the DL transmission is 15 KHz, a time length occupied by each slot is 1 ms, and if a slot contains N symbols, the time length occupied by each symbol is $1/14$ ms, where the value of N is 12 or 14. For another example, if the SCS of the DL transmission is 30 KHz, the time length occupied by each slot is 0.5 ms, and if a slot contains N symbols, the time length occupied by each symbol is $1/28$ ms, where the value of N is 12 or 14.

Optionally, determining the fifth number of symbols based on the SCS of the DCI and the SCS of the DL transmission means that the value of the fifth number is $$d_1 \frac{2^{\mu_{DL}}}{2^{\mu_{DCI}}},$$

where $d_1$ is the number value of symbols, $2^{\mu_{DL}}$ is the SCS of the DL transmission and $2^{\mu_{DCI}}$ is the SCS of the DCI. After the value of fifth number is determined, the time length occupied by each symbol in the fifth number of symbols is the same as the time length occupied by each symbol in the fourth number of symbols, which is determined based on the SCS of the DL transmission.

Optionally, the sixth number of symbols are determined based on the SCS of the UL transmission, which means that a time length occupied by each symbol is determined based on the SCS of the UL transmission. For example, if the SCS of the UL transmission is 15 KHz, a time length of each slot is 1 ms, and if a slot contains N symbols, the time length occupied by each symbol is $1/14$ ms, where the value of N is 12 or 14; For another example, if the SCS of the UL transmission is 30 KHz, the time length of each slot is 0.5 ms, and if a slot contains N symbols, the time length occupied by each symbol is $1/28$ ms, where the value of N is 12 or 14.

Optionally, determining the seventh number of symbols based on the SCS of the DCI and the SCS of the UL transmission means that the value of the seventh number is $$d_2 \frac{2^{\mu_{UL}}}{2^{\mu_{DCI}}},$$

where $d_2$ is the number value of symbols, $2^{\mu_{UL}}$ is the SCS of the UL transmission and $2^{\mu_{DCI}}$ is the SCS of the DCI. After the value of the seventh number is determined, the time length occupied by each symbol in the seventh number of symbols is the same as the time length occupied by each symbol in the sixth number of symbols, which is determined based on the SCS of the UL transmission.

Optionally, the value of the fourth number and/or the value of the sixth number is configured by the network device. The value of the fourth number and the value of the sixth number may be the same or different.

Optionally, the values of $d_1$ and/or $d_2$ are configured by the network device, or determined by the terminal according to the SCS of the UL transmission and/or the SCS of the DL transmission, and a mapping table between SCS and, $d_1$ and/or $d_2$.

Through the embodiment of the disclosure, it is achieved that the fourth number and/or the fifth number and/or the sixth number and/or the seventh number is determined according to the SCS of the UL transmission and/or the SCS of the DL transmission and the SCS of the DCI, and the corresponding beam application time of UL transmission and/or the corresponding beam application time of DL transmission is determined according to the symbol numbers and the transmission time of the HARQ ACK feedback. This ensures the consistency between beams of the network device and beams of the terminal device, and improves the transmission performance.

Optionally, a time length for the plurality of symbols is a second time value; or the plurality of symbols include an eighth number of symbols and a ninth number of symbols, in which the eighth number of symbols are determined based on a SCS of the UL transmission, the ninth number of symbols are determined based on a SCS of the DCI and a SCS of the UL transmission; or the eighth number of symbols are determined based on a SCS of the DL transmission, the ninth number of symbols are determined based on a SCS of the DCI and a SCS of the DL transmission; the beam application time is the beam application time for UL transmission and DL transmission.

In the embodiment of the disclosure, when the DCI and the UL transmission and/or DL transmission correspond to component carriers of different carriers, and the SCS corresponding to the DCI is smaller than the SCS of the UL transmission and/or the SCS of the DL transmission, the time length for the plurality of symbols may be the second time value, and the second time value is an absolute time value, rather than the number/quantity of the symbols. That is, the beam application time is after the transmission time of the HARQ ACK feedback, with the second time value therebetween. The specific numerical value of the second time value may be adjusted by an implementer according to an actual implementation situation, which is not limited in the disclosure. In a possible implementation, the second time value is configured by the network device. The unified TCI state is used for UL transmission and DL transmission. That is, regardless of specific numerical values for the SCS of the UL transmission and the SCS of the DL transmission, both UL transmission and DL transmission adopt the TCI state indicated by the DCI after the second time.

Alternatively, when the DCI and the DL transmission correspond to component carriers of different carriers and the SCS corresponding to the DCI is smaller than the SCS of the DL transmission, the terminal device cannot process data in time and thus needs additional delays (i.e., additional symbols). After determining the eighth number of symbols based on the SCS of the DL transmission, the additional number of symbols are determined. The additional number of symbols are proportional to the SCS of the DL transmission and inversely proportional to the SCS of the DCI. The additional number of symbols are the ninth number of symbols. The beam application time is after the transmission time of the HARQ ACK feedback, with a sum of the eighth number of symbols and the ninth number of symbols therebetween. The symbols are time symbols, and the unified TCI state is used for UL transmission and DL transmission. That is, the SCS of the DL transmission is used to determine the time length occupied by the eighth number of symbols and the value of the ninth number. In this case, if the SCS of the UL transmission is different from the SCS of the DL transmission, both UL transmission and DL transmission may also adopt the TCI state indicated by the DCI after the same time.

Alternatively, when the DCI and the UL transmission correspond to component carriers of different carriers and the SCS corresponding to the DCI is smaller than the SCS of the UL transmission, the terminal device cannot process data in time and thus needs additional delays (i.e., additional symbols). After determining the eighth number of symbols based on the SCS of the UL transmission, the additional number of symbols are determined. The additional number of symbols are proportional to the SCS of the UL transmission and inversely proportional to the SCS of the DCI. The additional number of symbols are the ninth number of symbols. The beam application time is after the transmission time of the HARQ ACK feedback, with a sum of the eighth number of symbols and the ninth number of symbols therebetween. The symbols are time symbols, and the unified TCI state is used for UL transmission and DL transmission. That is, the SCS of the UL transmission is used to determine the time length occupied by the eighth number of symbols and the value of the ninth number. In this case, if the SCS of the UL transmission is different from the SCS of the DL transmission, both UL transmission and DL transmission may also adopt the TCI state indicated by DCI after the same time.

Optionally, the eighth number of symbols are determined based on the SCS of the UL transmission, which means that a time length occupied by each symbol is determined based on the SCS of the UL transmission. For example, if the SCS of the UL transmission is 15 KHz, the time length of each slot is 1 ms, and if a slot contains N symbols, the time length occupied by each symbol is 1/14 ms, where the value of N is 12 or 14. For another example, if the SCS of the UL transmission is 30 KHz, then the time length occupied by each slot is 0.5 ms, and if a slot contains N symbols, the time length occupied by each symbol is 1/28 ms, where the value of N is 12 or 14.

Optionally, determining the ninth number of symbols based on the SCS of the DCI and the SCS of the UL transmission means that the value of the ninth number is $$d_3 \frac{2^{\mu_{UL}}}{2^{\mu_{DCI}}},$$

where $d_3$ is the number value of symbols, $2^{\mu_{UL}}$ is the SCS of the UL transmission and $2^{\mu_{DCI}}$ is the SCS of the DCI. After the value of the ninth number is determined, the time length occupied by each symbol in the ninth number of symbols is the same as the time length occupied by each symbol in the eighth number of symbols, which is determined based on the SCS of the UL transmission.

Optionally, the eighth number of symbols are determined based on the SCS of the DL transmission, which means that a time length occupied by each symbol is determined based on the SCS of the DL transmission. For example, if the SCS of the DL transmission is 15 KHz, a time length of each slot is 1 ms, and if a slot contains N symbols, the time length occupied by each symbol is 1/14 ms, where The value of The value of N is 12 or 14; For another example, if the SCS of the DL transmission is 30 KHz, the time length of each slot is 0.5 ms, and if a slot contains N symbols, the time length occupied by each symbol is 1/28 ms, where the value of N is 12 or 14.

Optionally, determining the ninth number of symbols based on the SCS of the DCI and the SCS of the DL transmission means that the value of the ninth number is $$d_4 \frac{2^{\mu_{UL}}}{2^{\mu_{DCI}}},$$

where $d_4$ is the number value of symbols, $2^{\mu_{DL}}$ is the SCS of the DL transmission and $2^{\mu_{DCI}}$ is the SCS of the DCI. After the value of the ninth number is determined, the time length occupied by each symbol in the ninth number of symbols is the same as the time length occupied by each symbol in the eighth number of symbols, which is determined based on the SCS of the DL transmission.

Optionally, the value of the eighth number is configured by the network device.

Optionally, the values of $d_3$ and/or $d_4$ are configured by the network device, or determined by the terminal according to the SCS of the UL transmission and/or the SCS of the DL transmission, and a mapping table between SCS and, $d_3$ and/or $d_4$.

Through the embodiment of the disclosure, it is achieved that the corresponding beam application for UL transmission and/or the corresponding beam application time of DL transmission is determined according to the SCS of the UL transmission and/or the SCS of the DL transmission and/or the SCS of the DCI, and the transmission time of the HARQ ACK feedback; or the corresponding beam application for UL transmission and/or the corresponding beam application time of DL transmission is determined according to the second time value and the transmission time of the HARQ ACK feedback. This ensures the consistency between beams of the network device and beams of the terminal device, and improves the transmission performance.

Optionally, the DCI and the UL transmission and/or DL transmission correspond to component carriers of different carriers, and the SCS corresponding to the DCI is smaller than the SCS of the UL transmission and/or the SCS of the DL transmission.

In the embodiment of the disclosure, when the DCI and the UL transmission and/or DL transmission correspond to the component carriers of different carriers, and the SCS corresponding to the DCI is smaller than the SCS of the UL transmission and/or the SCS of the DL transmission, the terminal device cannot process the data in time and thus needs additional delays (i.e., additional symbols).

Optionally, the DL transmission includes a DL channel and/or a DL reference signal. The DL channel includes at least one of: a PDCCH, a PDSCH, and a physical broadcast channel (PBCH). The DL reference signal includes at least one of: a synchronization signal block (SSB), a CSI-RS, a Demodulation Reference Signal (DMRS), or a PRS.

Optionally, the UL transmission includes a UL channel and/or a UL reference signal. The UL channel includes at least one of: a PUSCH, a PUCCH, or a physical random access channel (PRACH). The UL reference signal includes at least one of: a SRS, or a DMRS.

Optionally, different component carriers corresponding to the DCI and the UL transmission and/or DL transmission include: different component carriers corresponding to different serving cells, or different component carriers corresponding to serving cells and non-serving cells.

Figure 3:
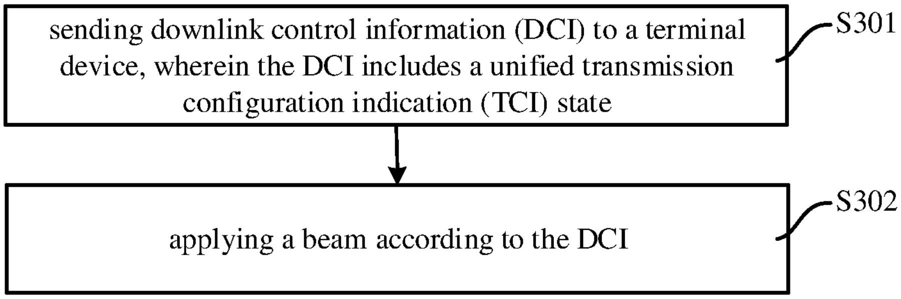
FIG. 3 is a flowchart illustrating a method for beam application according to an embodiment of the disclosure.

Referring to FIG. 3, it is a flowchart illustrating a method for beam application according to an embodiment of the disclosure. The method is applied to a network device. As shown in FIG. 3, the method may include but is not limited to the following steps.

At S301, DCI is sent to a terminal device, in which the DCI includes a unified TCI state.

In the embodiment of the disclosure, the network device sends the DCI to the terminal device, in which the DCI includes the unified TCI state. The beam is indicated according to the unified TCI state or common TCI state in the DCI, and the beam may be a common beam. After the terminal device receives the unified TCI state or common TCI state in the DCI, the terminal device may apply the beam.

At S302, a beam is applied according to the DCI.

In the embodiment of the disclosure, a beam application time corresponding to a beam is obtained according to the DCI. The beam application time is a time point of starting to apply the beam. In order to ensure the communication quality, the beam application time for the network device need to be consistent with that for the terminal device. After receiving the unified TCI state in the DCI, the beam application time for UL transmission and/or the beam application time for DL transmission corresponding to the unified TCI state may be determined.

Through the embodiment of the disclosure, it is achieved that the corresponding beam application time for UL transmission and/or the beam application time for DL transmission is determined based on the DCI, and beam application is performed. This ensures the consistency between beams of the network device and beams of the terminal device, and improves the transmission performance.

In the above-mentioned embodiments of the disclosure, the methods according to the embodiments of the disclosure are introduced from the perspectives of the network device and the terminal device. In order to implement each function in the methods according to the above embodiments of the disclosure, the network device and the terminal device may include hardware structures and software modules to implement the above functions in the form of hardware structures, software modules, or hardware structures plus software modules. A certain function among the above functions may be executed by a hardware structure, a software module, or a hardware structure plus a software module.

Figure 4:
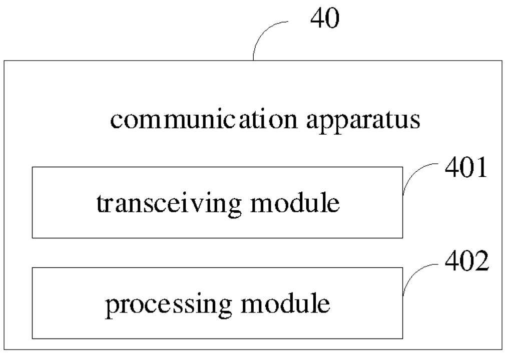
FIG. 4 is a structural diagram illustrating a communication apparatus according to an embodiment of the disclosure.

Referring to FIG. 4, it is a structural diagram illustrating a communication apparatus 40 according to an embodiment of the disclosure. The communication apparatus 40 shown in FIG. 4 may include a transceiving module 401 and a processing module 402. The transceiving module 401 may include a sending module and/or a receiving module. The sending module is used to implement a sending function, and the receiving module is used to implement a receiving function. The transceiving module 401 may implement the sending function and/or the receiving function.

The communication apparatus 40 may be a terminal device (such as the terminal device in the above method embodiments), an apparatus in the terminal device, or an apparatus that may be used in conjunction with the terminal device. Alternatively, the communication apparatus 40 may be a network device, an apparatus in the network device, or an apparatus that may be used in conjunction with the network device.

When the communication apparatus 40 is a terminal device (such as the terminal device in the above method embodiments), the communication apparatus includes: a receiving module, and a determination module.

The receiving module is configured to receive DCI from a network device, in which the DCI includes a unified TCI state.

In the embodiment of the disclosure, the beam is indicated according to the unified TCI state or the common TCI state in the DCI, and the beam may be a common beam. After the terminal device receives the unified TCI state or common TCI state in the DCI, the terminal device may apply the beam.

The determining module is configured to determine a beam application time for UL transmission and/or a beam application time for DL transmission corresponding to the unified TCI state.

In the embodiment of the disclosure, the beam application time is a time point of starting to apply the beam. In order to ensure the communication quality, the beam application time for the network device needs to be consistent with that for the terminal device. After receiving the unified TCI state in the DCI, the beam application time for UL transmission and/or the beam application time for DL transmission corresponding to the unified TCI state may be determined.

Through the embodiment of the disclosure, it is achieved that the corresponding beam application time for UL transmission and/or the beam application time for DL transmission is determined according to the DCI, and beam application is performed. This ensures the consistency between beams of the network device and beams of the terminal device, and improves the transmission performance.

In an implementation, the DCI includes or does not include DL assignment indication information.

The DCI may include the DL assignment indication information, which is used to indicate a time-frequency resource of the PDSCH. Alternatively, the DCI may not include the DL assignment indication information.

In an implementation, the beam application time for UL transmission and/or the beam application time for DL transmission is after a transmission time of a HARQ ACK feedback for the DCI, with a plurality of symbols therebetween. The beam application time for UL transmission and/or the beam application time for DL transmission is an application time of the unified TCI state.

In the embodiment of the disclosure, the HARQ is a technology that combines forward error correction (FEC) and automatic repeat request (ARQ). The basic principle of HARQ is as follows. The FEC technology is used at a receiving end to correct a part of errors in all the errors that may be corrected; error detection is performed and data packets that cannot be corrected are determined; the data packets that cannot be corrected are discarded; and a sending end is requested to resend same data packs. The HARQ ACK is feedback information sent by receiving end to the sending end. The terminal device is a receiving end, and the beam application time is a time point spacing a plurality of symbols after the time point when the terminal device sends the HARQ ACK to the network device.

Through the embodiment of the disclosure, it is achieved that the corresponding beam application time for UL transmission and/or the beam application time for DL transmission is determined according to the transmission time of the HARQ ACK feedback for the DCI. This ensures the consistency between beams of the network device and beams of the terminal device, and improves the transmission performance.

In an implementation, the plurality of symbols are a first number of symbols, the first number of symbols are determined based on a SCS of the DL transmission, and the beam application time is the beam application time for DL transmission; and/or the plurality of symbols are a second number of symbols, the second number of symbols are determined based on a SCS of the UL transmission, and the beam application time is the beam application time for UL transmission.

In the embodiment of the disclosure, the beam application time is after the transmission time of the HARQ ACK feedback, with the first number of symbols therebetween, the first number of symbols are determined based on the SCS of the DL transmission, the symbols are time symbols, and the beam application time is the beam application time for DL transmission; and/or the beam application time is after the transmission time of the HARQ ACK feedback, with the second number of symbols therebetween, the second number of symbols are determined based on the SCS of the UL transmission, the symbols are time symbols, and the beam application time is the beam application time for UL transmission.

Optionally, the first number of symbols are determined based on the SCS of the DL transmission, which means that a time length occupied by each symbol is determined based on the SCS of the DL transmission. For example, if the SCS of the DL transmission is 15 KHz, the time length of each slot is 1 ms, and if a slot contains N symbols, the time length occupied by each symbol is $\frac{1}{14}$ ms, where the value of N is 12 or 14. For another example, if the SCS of the DL transmission is 30 KHz, the time length of each slot is 0.5 ms, and if a slot contains N symbols, the time length occupied by each symbol is $\frac{1}{28}$ ms, where the value of N is 12 or 14.

Optionally, the second number of symbols are determined based on the SCS of the UL transmission, which means that a time length occupied by each symbol is determined based on the SCS of the UL transmission. For example, if the SCS of the UL transmission is 15 KHz, the time length of each slot is 1 ms, and if a slot contains N symbols, the time length occupied by each symbol is $\frac{1}{14}$ ms, where the value of N is 12 or 14. For another example, if the SCS of the UL transmission is 30 KHz, the time length of each slot is 0.5 ms, and if a slot contains N symbols, the time length occupied by each symbol is $\frac{1}{28}$ ms, where the value of N is 12 or 14.

Optionally, the value of the first number and/or the value of the second number are configured by the network device. The value of the first number and the value of the second number may be the same or different.

Through the embodiment of the disclosure, it is achieved that the first number of symbols and/or the second number of symbols are determined according to the SCS, and the corresponding beam application time for UL transmission and/or the corresponding beam application time for DL transmission is determined according to the symbol number and the transmission time of the HARQ ACK feedback. This ensures the consistency between beams of the network device and beams of the terminal device, and improves the transmission performance.

In an implementation, a time length for the plurality of symbols is a first time value; or the plurality of symbols are a third number of symbols, in which the third number of symbols are determined based on a SCS of the UL transmission or a SCS of the DL transmission, and the beam application time is the beam application time for UL transmission and DL transmission.

In the embodiment of the disclosure, the time length for the plurality of symbols may be the first time value, and the first time value is an absolute time value, rather than the number/quantity of the symbols. That is, the beam application time is after the transmission time of the HARQ ACK feedback, with the first time value therebetween. The specific numerical value of the first time value may be adjusted by an implementer according to an actual implementation situation, which is not limited in the disclosure. In a possible implementation, the first time value is configured by the network device. The beam application time is the beam application time for UL transmission and DL transmission. That is, regardless of specific numerical values for the SCS of the UL transmission and the SCS of the DL transmission, both UL transmission and DL transmission adopt the TCI state indicated by the DCI after the first time.

Alternatively, the beam application time is after the transmission time of the HARQ ACK feedback, with the third number of symbols therebetween. The third number of symbols are determined based on the SCS of the UL transmission or the SCS of the DL transmission, where the symbols are time symbols, and the beam application time is the beam application time of the UL transmission or the beam application time for DL transmission. That is, one of the SCS of the UL transmission and the SCS of the DL transmission is used to determine a time length occupied by each symbol in the third number of symbols. In this case, if the SCS of the UL transmission is different from the SCS of the DL transmission, both UL transmission and DL transmission may also adopt the TCI state indicated by DCI after the same time value.

Optionally, the value of the third number is configured by the network device, in which the third number of symbols are determined based on the SCS of the UL transmission or the SCS of the DL transmission, which means that the time length occupied by each symbol in the third number of symbols is determined by the SCS of the UL transmission or the SCS of the DL transmission.

Through the embodiment of the disclosure, it is achieved that the third number of symbols are determined according to the SCS of the UL transmission or the SCS of the DL transmission, and the corresponding beam application time for UL transmission and/or the beam application time for DL transmission is determined according to the symbol number and the transmission time of the HARQ ACK feedback; or the corresponding beam application time for UL transmission and/or the beam application time for DL transmission is determined according to the first time value and the transmission time of the HARQ ACK feedback. This ensures the consistency between beams of the network device and beams of the terminal device, and improves the transmission performance.

In an implementation, the DCI and the UL transmission and/or DL transmission correspond to a component carrier of a same carrier; or the DCI and the UL transmission and/or the DL transmission correspond to component carriers of different carriers, and the SCS corresponding to the DCI is greater than or equal to a SCS of the UL transmission and/or a SCS of the DL transmission.

In an implementation, the plurality of symbols include a fourth number of symbols and a fifth number of symbols, in which the fourth number of symbols are determined based on a SCS of the DL transmission, the fifth number of symbols are determined based on a SCS of the DCI and a SCS of the DL transmission, and the beam application time is the beam application time for DL transmission; and/or the plurality of symbols include a sixth number of symbols and a seventh number of symbols, in which the sixth number of symbols are determined based on a SCS of the UL transmission, the seventh number of symbols are determined based on a SCS of the DCI and a SCS of the UL transmission, and the beam application time is the beam application time for UL transmission.

In the embodiment of the disclosure, when the DCI and the DL transmission correspond to component carriers of different carriers and the SCS corresponding to the DCI is smaller than the SCS of the DL transmission, then the terminal device cannot process data in time and thus needs additional delays (i.e. additional symbols); the additional number of symbols are determined after determining the fourth number of symbols based on the SCS of the DL transmission; the additional number of symbols are proportional to the SCS of the DL transmission and inversely proportional to the SCS of the DCI; the additional number of symbols are the fifth number of symbols; the plurality of symbols include the fourth number of symbols and the fifth number of symbols, and the beam application time is after the transmission time of the HARQ ACK feedback, with a sum of the fourth number of symbols and the fifth number of symbols therebetween, in which the symbols are time symbols, and the beam application time is the beam application time for DL transmission; and/or when the DCI and the UL transmission correspond to component carriers of different carriers and the SCS corresponding to the DCI is smaller than the SCS of the UL transmission, then the terminal device cannot process data in time and thus needs additional delay (i.e., additional symbols); the additional number of symbols are determined after determining the sixth number of symbols based on the SCS of the UL transmission; the additional number of symbols are proportional to the SCS of the UL transmission and inversely proportional to the SCS of the DCI; the additional number of symbols are the seventh number of symbols; the beam application time is after the transmission time of the HARQ ACK feedback, with a sum of the sixth number of symbols and the seventh number of symbols therebetween, in which the symbols are time symbols, and the beam application time is the beam application time for UL transmission.

Optionally, the fourth number of symbols are determined based on the SCS of the DL transmission, which means that a time length occupied by each symbol is determined based on the SCS of the DL transmission. For example, if the SCS of the DL transmission is 15 KHz, a time length occupied by each slot is 1 ms, and if a slot contains N symbols, the time length occupied by each symbol is 1/14 ms, where the value of N is 12 or 14. For another example, if the SCS of the DL transmission is 30 KHz, the time length occupied by each slot is 0.5 ms, and if a slot contains N symbols, the time length occupied by each symbol is 1/28 ms, where the value of N is 12 or 14.

Optionally, determining the fifth number of symbols based on the SCS of the DCI and the SCS of the DL transmission means that the value of the fifth number is $$d_1 \frac{2^{\mu_{DL}}}{2^{\mu_{DCI}}},$$

where $d_1$ is the number value of symbols, $2^{\mu_{DL}}$ is the SCS of the DL transmission and $2^{\mu_{DCI}}$ is the SCS of the DCI. After the value of fifth number is determined, the time length occupied by each symbol in the fifth number of symbols is the same as the time length occupied by each symbol in the fourth number of symbols, which is determined based on the SCS of the DL transmission.

Optionally, the sixth number of symbols are determined based on the SCS of the UL transmission, which means that a time length occupied by each symbol is determined based on the SCS of the UL transmission. For example, if the SCS of the UL transmission is 15 KHz, a time length of each slot is 1 ms, and if a slot contains N symbols, the time length occupied by each symbol is 1/14 ms, where the value of N is 12 or 14; For another example, if the SCS of the UL transmission is 30 KHz, the time length of each slot is 0.5 ms, and if a slot contains N symbols, the time length occupied by each symbol is 1/28 ms, where the value of N is 12 or 14.

Optionally, determining the seventh number of symbols based on the SCS of the DCI and the SCS of the UL transmission means that the value of the seventh number is $$d_2\frac{2^{\mu_{UL}}}{2^{\mu_{DCI}}},$$

where $d_2$ is the number value of symbols, $2^{\mu_{UL}}$ is the SCS of the UL transmission and $2^{\mu_{DCI}}$ is the SCS of the DCI. After the value of the seventh number is determined, the time length occupied by each symbol in the seventh number of symbols is the same as the time length occupied by each symbol in the sixth number of symbols, which is determined based on the SCS of the UL transmission.

Optionally, the value of the fourth number and/or the value of the sixth number is configured by the network device. The value of the fourth number and the value of the sixth number may be the same or different.

Optionally, the values of $d_1$ and/or $d_2$ are configured by the network device, or determined by the terminal according to the SCS of the UL transmission and/or the SCS of the DL transmission, and a mapping table between SCS and, $d_1$ and/or $d_2$.

Through the embodiment of the disclosure, it is achieved that the fourth number and/or the fifth number and/or the sixth number and/or the seventh number is determined according to the SCS of the UL transmission and/or the SCS of the DL transmission and the SCS of the DCI, and the corresponding beam application time of UL transmission and/or the corresponding beam application time of DL transmission is determined according to the symbol numbers and the transmission time of the HARQ ACK feedback. This ensures the consistency between beams of the network device and beams of the terminal device, and improves the transmission performance.

In an implementation, a time length for the plurality of symbols is a second time value; or the plurality of symbols include an eighth number of symbols and a ninth number of symbols, in which the eighth number of symbols are determined based on a SCS of the UL transmission, the ninth number of symbols are determined based on a SCS of the DCI and a SCS of the UL transmission; or the eighth number of symbols are determined based on a SCS of the DL transmission, the ninth number of symbols are determined based on a SCS of the DCI and a SCS of the DL transmission; the beam application time is the beam application time for UL transmission and DL transmission.

In the embodiment of the disclosure, when the DCI and the UL transmission and/or DL transmission correspond to component carriers of different carriers, and the SCS corresponding to the DCI is smaller than the SCS of the UL transmission and/or the SCS of the DL transmission, the time length for the plurality of symbols may be the second time value, and the second time value is an absolute time value, rather than the number/quantity of the symbols. That is, the beam application time is after the transmission time of the HARQ ACK feedback, with the second time value therebetween. The specific numerical value of the second time value may be adjusted by an implementer according to an actual implementation situation, which is not limited in the disclosure. In a possible implementation, the second time value is configured by the network device. That is, regardless of specific numerical values for the SCS of the UL transmission and the SCS of the DL transmission, both UL transmission and DL transmission adopt the TCI state indicated by the DCI after the second time. The unified TCI state is used for UL transmission and DL transmission.

Alternatively, when the DCI and the DL transmission correspond to component carriers of different carriers and the SCS corresponding to the DCI is smaller than the SCS of the DL transmission, the terminal device cannot process data in time and thus needs additional delays (i.e., additional symbols). After determining the eighth number of symbols based on the SCS of the DL transmission, the additional number of symbols are determined. The additional number of symbols are proportional to the SCS of the DL transmission and inversely proportional to the SCS of the DCI. The additional number of symbols are the ninth number of symbols. The beam application time is after the transmission time of the HARQ ACK feedback, with a sum of the eighth number of symbols and the ninth number of symbols therebetween. The symbols are time symbols, and the unified TCI state is used for UL transmission and DL transmission. That is, the SCS of the DL transmission is used to determine the time length occupied by the eighth number of symbols and the value of the ninth number. In this case, if the SCS of the UL transmission is different from the SCS of the DL transmission, both UL transmission and DL transmission may also adopt the TCI state indicated by the DCI after the same time.

Alternatively, when the DCI and the UL transmission correspond to component carriers of different carriers and the SCS corresponding to the DCI is smaller than the SCS of the UL transmission, the terminal device cannot process data in time and thus needs additional delays (i.e., additional symbols). After determining the eighth number of symbols based on the SCS of the UL transmission, the additional number of symbols are determined. The additional number of symbols are proportional to the SCS of the UL transmission and inversely proportional to the SCS of the DCI. The additional number of symbols are the ninth number of symbols. The beam application time is after the transmission time of the HARQ ACK feedback, with a sum of the eighth number of symbols and the ninth number of symbols therebetween. The symbols are time symbols, and the unified TCI state is used for UL transmission and DL transmission. That is, the SCS of the UL transmission is used to determine the time length occupied by the eighth number of symbols and the value of the ninth number. In this case, if the SCS of the UL transmission is different from the SCS of the DL transmission, both UL transmission and DL transmission may also adopt the TCI state indicated by DCI after the same time.

Optionally, the eighth number of symbols are determined based on the SCS of the UL transmission, which means that a time length occupied by each symbol is determined based on the SCS of the UL transmission. For example, if the SCS of the UL transmission is 15 KHz, the time length of each slot is 1 ms, and if a slot contains N symbols, the time length occupied by each symbol is 1/14 ms, where the value of N is 12 or 14. For another example, if the SCS of the UL transmission is 30 KHz, then the time length occupied by each slot is 0.5 ms, and if a slot contains N symbols, the time length occupied by each symbol is 1/28 ms, where the value of N is 12 or 14.

Optionally, determining the ninth number of symbols based on the SCS of the DCI and the SCS of the UL transmission means that the value of the ninth number is $$d_3\frac{2^{\mu_{UL}}}{2^{\mu_{DCI}}},$$

where $d_3$ is the number value of symbols, $2^{\mu_{UL}}$ is the SCS of the UL transmission and $2^{\mu_{DCI}}$ is the SCS of the DCI. After the value of the ninth number is determined, the time length occupied by each symbol in the ninth number of symbols is the same as the time length occupied by each symbol in the eighth number of symbols, which is determined based on the SCS of the UL transmission.

Optionally, the eighth number of symbols are determined based on the SCS of the DL transmission, which means that a time length occupied by each symbol is determined based on the SCS of the DL transmission. For example, if the SCS of the DL transmission is 15 KHz, a time length of each slot is 1 ms, and if a slot contains N symbols, the time length occupied by each symbol is 1/14 ms, where The value of The value of N is 12 or 14; For another example, if the SCS of the DL transmission is 30 KHz, the time length of each slot is 0.5 ms, and if a slot contains N symbols, the time length occupied by each symbol is 1/28 ms, where the value of N is 12 or 14.

Optionally, determining the ninth number of symbols based on the SCS of the DCI and the SCS of the DL transmission means that the value of the ninth number is $$d_4\frac{2^{\mu_{DL}}}{2^{\mu_{DCI}}},$$

where $d_4$ is the number value of symbols, $2^{\mu_{DL}}$ is the SCS of the DL transmission and $2^{\mu_{DCI}}$ is the SCS of the DCI. After the value of the ninth number is determined, the time length occupied by each symbol in the ninth number of symbols is the same as the time length occupied by each symbol in the eighth number of symbols, which is determined based on the SCS of the DL transmission.

Optionally, the value of the eighth number is configured by the network device.

Optionally, the values of $d_3$ and/or $d_4$ are configured by the network device, or determined by the terminal according to the SCS of the UL transmission and/or the SCS of the DL transmission, and a mapping table between SCS and, $d_3$ and/or $d_4$.

Through the embodiment of the disclosure, it is achieved that the corresponding beam application for UL transmission and/or the corresponding beam application time of DL transmission is determined according to the SCS of the UL transmission and/or the SCS of the DL transmission and/or the SCS of the DCI, and the transmission time of the HARQ ACK feedback; or the corresponding beam application for UL transmission and/or the corresponding beam application time of DL transmission is determined according to the second time value and the transmission time of the HARQ ACK feedback. This ensures the consistency between beams of the network device and beams of the terminal device, and improves the transmission performance.

In an implementation, the DCI and the UL transmission and/or DL transmission correspond to component carriers of different carriers, and the SCS corresponding to the DCI is smaller than the SCS of the UL transmission and/or the SCS of the DL transmission.

In the embodiment of the disclosure, when the DCI and the UL transmission correspond to the component carriers of different carriers and the SCS corresponding to the DCI is smaller than the SCS of the UL transmission, the terminal device cannot process the data in a timely manner and thus needs additional delays (i.e., additional symbols).

In an implementation, the DL transmission includes a DL channel and/or a DL reference signal. The DL channel includes at least one of: a PDCCH, a PDSCH, and a PBCH. The DL reference signal includes at least one of: a SSB, a CSI-RS, a DMRS, or a PRS.

In an implementation, the UL transmission includes a UL channel and/or a UL reference signal. The UL channel includes at least one of: a PUSCH, a PUCCH, or a PRACH. The UL reference signal includes at least one of: a SRS, or a DMRS.

In an implementation, different component carriers corresponding to the DCI and the UL transmission and/or DL transmission include: different component carriers corresponding to different serving cells, or different component carriers corresponding to serving cells and non-serving cells.

When the communication apparatus 40 is a network device, which includes: a sending module and an applying module. The sending module is configured to send DCI to a terminal device, in which the DCI includes a unified TCI state.

In the embodiment of the disclosure, the network device sends the DCI to the terminal device, in which the DCI includes the unified TCI state. The beam is indicated according to the unified TCI state or common TCI state in the DCI, and the beam may be a common beam. After the terminal device receives the unified TCI state or common TCI state in the DCI, the terminal device may apply the beam.

The applying module is configured to apply a beam according to the DCI.

In the embodiment of the disclosure, the beam application time corresponding to the beam is obtained according to the DCI. The beam application time is a time point of starting to apply the beam. In order to ensure the communication quality, the beam application time for the network device needs to be consistent with that for the terminal device. After the unified TCI state in the DCI is received, the beam application time for UL transmission and/or the beam application time for DL transmission corresponding to the unified TCI state may be determined.

Through the embodiment of the disclosure, it is achieved that the corresponding beam application time for UL transmission and/or the corresponding beam application time for DL transmission is determined according to the DCI, and beam application is performed. This ensures a consistency between beams of the network device and beams of the terminal device, and improves a transmission performance.

Figure 5:
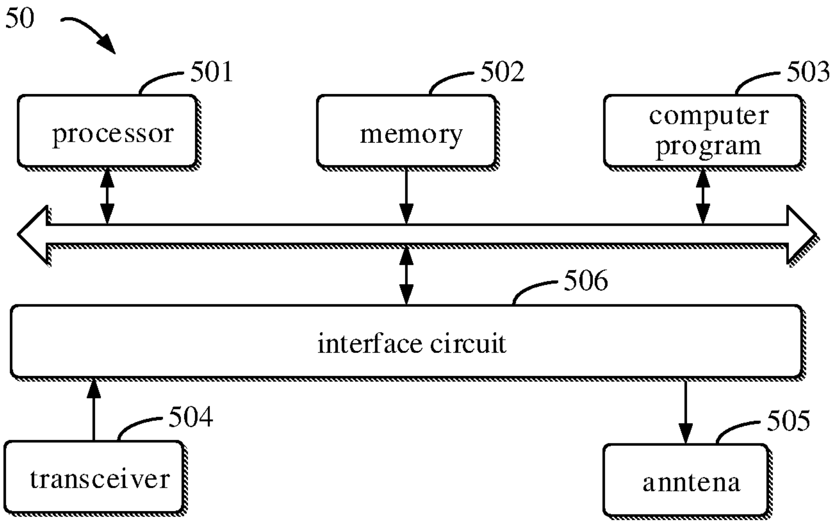
FIG. 5 is a structural diagram illustrating a communication apparatus according to an embodiment of the disclosure.

Referring to FIG. 5, it is a structural diagram illustrating a communication apparatus according to an embodiment of the disclosure. The communication device 50 may be a network device, a terminal device (such as the terminal device in the above method embodiments), a chip/a chip system/a processor, etc. that supports the network device to implement the above methods, or a chip/a chip system/a processor, etc. that supports the terminal device to implement the above methods. The details may refer to the description of the above method embodiments.

The communication device 50 may include one or more processors 501. The processor 501 may be a general-purpose processor or a special-purpose processor, or the like. For example, it may be a baseband processor or a central processing unit (CPU). The baseband processor may be used to process communication protocols and communication data. The CPU may be used to control the communication device (such as a base station, a baseband chip, a terminal device, a terminal device chip, a DU or a CU, etc.) to execute computer programs and to process data in the computer programs.

Optionally, the communication device 50 may also include one or more memories 502, on which a computer program 503 may be stored. The computer program 503 is executed by the processor 501, so that the communication device 50 performs the steps described in the above method embodiments. Optionally, the memory 502 may also store data. The communication device 50 and the memory 502 may be provided separately or integrated together.

Optionally, the communication device 50 may also include a transceiver 504 and an antenna 505. The transceiver 504 may be called a transceiving unit, a transceiving circuit, etc., used to implement the transceiving function. The transceiver 504 may include a receiver and a sender. The receiver may be called a receiving unit, a receiving circuit, etc., used to implement the receiving function; the sender may be called a transmitter, a sending circuit, etc., used to implement the sending function.

Optionally, the communication device 50 may also include one or more interface circuits 506. The interface circuit 506 is used to receive code instructions and transmit the same to the processor 501. The code instructions are executed by the processor 501, the communication device 50 is caused to perform the method described in the above method embodiments.

The communication device 50 is a terminal device (such as the terminal device in the above method embodiments), the transceiver 504 is used to execute the step S201 in FIG. 2 and the processor 501 is used to execute the step S202 in FIG. 2.

The communication device 50 is a network device, the transceiver 504 is used to execute the step S301 in FIG. 3, and the processor 501 is used to execute the step S302 in FIG. 3.

In an implementation, the processor 501 may include a transceiver for implementing the receiving and sending functions. For example, the transceiver may be a transceiving circuit, an interface, or an interface circuit. The transceiving circuit, interface or interface circuit used to implement the receiving and sending functions may be separate or integrated together. The above transceiving circuit, interface or interface circuit may be used for reading and writing code/data, or the above transceiving circuit, interface or interface circuit may be used for signal transmission or transfer.

In an implementation, the processor 501 may store the computer program 503, and the computer program 503 is running on the processor 501, which may cause the communication device 50 to perform the method described in the above method embodiments. The computer program 503 may be solidified in the processor 501, in which case the processor 501 may be implemented in hardware.

In an implementation, the communication device 50 may include a circuit, and the circuit may implement the functions of sending or receiving or communicating in the above method embodiments. The processor and transceiver described in the disclosure may be implemented in integrated circuits (ICs), analog ICs, radio frequency integrated circuits RFICs, mixed signal ICs, application specific integrated circuits (ASICs), printed circuit boards (PCBs), electronic devices, etc. The processor and transceiver may also be manufactured using various IC processing technologies, such as complementary metal oxide semiconductor (CMOS), nMetal-oxide-semiconductor (NMOS), positive channel metal oxide semiconductor (PMOS), bipolar junction transistor (BJT), bipolar CMOS (BiCMOS), silicon germanium (SiGe), gallium arsenide (GaAs), etc.

The communication device described in the above embodiments may be a network device or a terminal device (such as the terminal device in the above method embodiments), but the scope of the communication device described in the disclosure is not limited, and the structure of the communication device may not be limited to FIG. 5. The communication device may be a stand-alone device or may be a part of a large device. For example, the communication device may be:

(1) an independent IC, or a chip, or a chip system or a subsystem;
(2) a collection of one or more ICs, the collection may also include storage components for storing data and computer programs, optionally;
(3) ASIC, such as modem;
(4) modules that may be embedded in other devices;
(5) a receiver, a terminal device, an intelligent terminal device, a cellular phone, a wireless device, a handheld device, a mobile unit, a vehicle-mounted device, a network device, a cloud device, an artificial intelligence device, etc.;
(6) others, etc.

Figure 6:
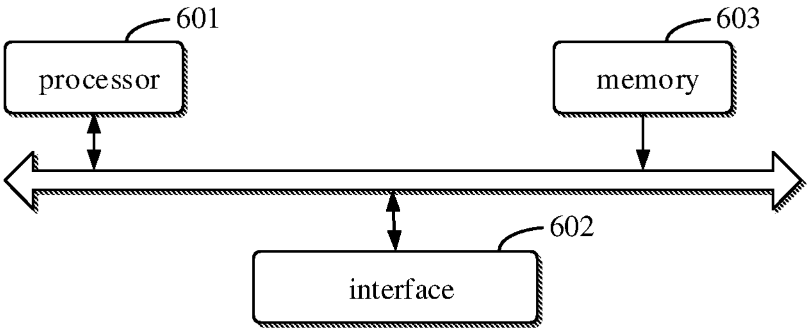
FIG. 6 is a structural diagram illustrating a chip according to an embodiment of the disclosure.

For the case where the communication device may be a chip or a chip system, a structural diagram of the chip shown in FIG. 6 may be referred. The chip shown in FIG. 6 includes a processor 601 and an interface 602. There may be one or more processors 601, and a plurality of interfaces 602.

For the case where the chip is used to implement the functions of the terminal device in the embodiments of the disclosure (such as the terminal device in the above method embodiments), it may be implemented that DCI from the network device is received, in which the DCI includes a unified TCI state and a beam application time for UL transmission and/or a beam application time for DL transmission is determined corresponding to the unified TCI state.

For the case where the chip is used to implement the functions of the network device in the embodiment of the disclosure, the interface is configured to send DCI to a terminal device, in which the DCI includes a unified TCI state; and the processor is configured to apply a beam according to the DCI.

Optionally, the chip also includes a memory 603, which is used to store necessary computer programs and data.

Those skilled in the art may also understand that the various illustrative logical blocks and steps listed in the embodiments of the disclosure may be implemented by electronic hardware, computer software, or a combination of both. Whether such functionality is implemented in hardware or software depends on a specific application and overall system design requirements. Those skilled in the art may use various methods to implement the described functions for each specific application, but such implementation should not be understood as going beyond the protection scope of the embodiments of the disclosure.

Embodiments of the disclosure also provide a system for beam application, which includes a communication apparatus served as a terminal device (such as the terminal device in the above method embodiments) and a communication apparatus served as a network device in the embodiment of FIG. 4, or the system includes a communication apparatus served as a terminal device (such as the terminal device in the above method embodiments) and a communication apparatus served as a network device in the embodiment of FIG. 5.

The disclosure also provides a readable storage medium on which instructions are stored. When the instructions are executed by a computer, the functions of any of the above method embodiments are implemented.

The disclosure also provides a computer program product that, when executed by a computer, implements the functions of any of the above method embodiments.

In the above embodiments, it may be implemented in whole or in part by software, hardware, firmware, or any combination. When implemented in software, it may be implemented in whole or in part in the form of a computer program product. The computer program product includes one or more computer programs. When the computer program is loaded and executed on a computer, the processes or functions described in the embodiments of the disclosure are generated in whole or in part. The computer may be a general-purpose computer, a special-purpose computer, a computer network, or other programmable device. The computer program may be stored in or transferred from one to another computer-readable storage medium, for example, the computer program may be transferred from a website, a computer, a server, or a data center to another website, another computer, another server or another data center through wired means (such as a coaxial cable, an optical fiber, a digital subscriber line (DSL)) or wireless means (such as infrared, wireless, microwave, etc.). The computer-readable storage medium may be any available medium that may be accessed by a computer or a data storage device such as a server, a data center, etc. that contains one or more available media integrated. The available media may be magnetic media (e.g., a floppy disk, a hard disk, a tape), optical media (e.g., a high-density digital video disc, DVD), or semiconductor media (e.g., a solid state disk, SSD) etc.

Those skilled in the art may understand that the first, second, and other numerical numbers involved in the disclosure are only for convenience of description and are not used to limit the scope of the embodiments of the disclosure and also indicate a sequential order.

The term "at least one" in the disclosure can also be described as one or more, and "a plurality of" may be two, three, four or more, which is not limited by the disclosure. In the embodiments of the disclosure, for a technical feature, the technical feature is distinguished by "first", "second", "third", "A", "B", "C" and "D", etc. The technical features described in "first", "second", "third", "A", "B", "C" and "D" are in no particular order or size sequence. As used herein, the term "and/or" or the expression "at least one . . . /at least one of . . . " includes any and all combinations of one or more of the associated listed items.

The corresponding relationships shown in each table in the disclosure may be configured or predefined. The values of the information in each table are only examples and may be configured as other values, which is not limited by the disclosure. When configuring the correspondence between information and each parameter, it is not necessarily required to configure all the correspondences shown in each table. For example, in the table in the disclosure, the corresponding relationships shown in some rows may not be configured. For another example, appropriate deformation adjustments may be made based on the above tables, such as splitting, merging, etc. The names of the parameters shown in the titles of the above tables may also be other names that may be understood by the communication device, and the values or expressions of the parameters may also be other values or expressions that may be understood by the communication device. When implementing the above tables, other data structures may also be used, such as arrays, queues, containers, stacks, linear lists, pointers, linked lists, trees, graphs, structures, classes, heaps, hash tables, etc.

Predefinition in the disclosure may be understood as definition, pre-definition, storage, pre-storage, pre-negotiation, pre-configuration, solidification, or pre-burning.

Those skilled in the art may be aware that the units and algorithm steps of each example described in conjunction with the embodiments disclosed herein can be implemented with electronic hardware, or a combination of computer software and electronic hardware. Whether these functions are executed in hardware or software depends on a specific application and design constraints of the technical solution. Those skilled in the art may implement the described functionality using different methods for each specific application, but such implementations should not be considered to go beyond the scope of the disclosure.

Those skilled in the art may clearly understand that for the convenience and simplicity of description, the specific working processes of the systems, devices and units described above may be referred to the corresponding processes in the foregoing method embodiments, which will not be repeated here.

The above are only specific embodiments of the disclosure, but the protection scope of the disclosure is not limited. Any person in the technical field may easily think of changes or substitutions within the technical scope disclosed in the disclosure, which should be covered by the protection scope of the disclosure. Therefore, the protection scope of the disclosure should be determined by the protection scope of the claims.

What is claimed is:

1. A method for beam application, performed by a terminal device, the method comprising:

receiving downlink control information (DCI) from a network device, wherein the DCI comprises a unified transmission configuration indication (TCI) state; and determining at least one of a beam application time for uplink (UL) transmission or a beam application time for downlink (DL) transmission corresponding to the unified TCI state;

wherein the at least one of the beam application time for UL transmission or the beam application time for DL transmission is after a transmission time of a hybrid automatic repeat request (HARQ) acknowledgment character (ACK) feedback for the DCI, with a plurality of symbols therebetween;

wherein when the DCI and at least one of the UL transmission or the DL transmission correspond to a component carrier of a same carrier; or the DCI and at least one of the UL transmission or the DL transmission correspond to component carriers of different carriers, and a subcarrier space (SCS) corresponding to the DCI is greater than or equal to at least one of a SCS of the UL transmission or a SCS of the DL transmission, the plurality of symbols are at least one of:

a first number of symbols determined based on the SCS of the DL transmission, wherein the beam application time is the beam application time for DL transmission;

a second number of symbols determined based on the SCS of the UL transmission, wherein the beam application time is the beam application time for UL transmission; or a third number of symbols determined based on the SCS of the UL transmission or the SCS of the DL transmission, wherein the beam application time is the beam application time for UL transmission and DL transmission.

2. The method according to claim 1, wherein when the DCI and at least one of the UL transmission or the DL transmission correspond to component carriers of different carriers, and the SCS corresponding to the DCI is smaller than at least one of the SCS of the UL transmission or the SCS of the DL transmission, the plurality of symbols comprise at least one of:

a fourth number of symbols and a fifth number of symbols, wherein the fourth number of symbols are determined based on the SCS of the DL transmission, the fifth number of symbols are determined based on a SCS of the DCI and the SCS of the DL transmission, and the beam application time is the beam application time for DL transmission;

a sixth number of symbols and a seventh number of symbols, wherein the sixth number of symbols are determined based on the SCS of the UL transmission, the seventh number of symbols are determined based on a SCS of the DCI and a SCS of the UL transmission, and the beam application time is the beam application time for UL transmission; or an eighth number of symbols and a ninth number of symbols, wherein the eighth number of symbols are determined based on the SCS of the UL transmission, the ninth number of symbols are determined based on a SCS of the DCI and the SCS of the UL transmission; or the eighth number of symbols are determined based on the SCS of the DL transmission, the ninth number of symbols are determined based on a SCS of the DCI and the SCS of the DL transmission; wherein the beam application time is the beam application time for UL transmission and DL transmission.

3. The method according to claim 1, wherein the DL transmission comprises at least one of a DL channel or a DL reference signal, the DL channel comprises at least one of: a physical downlink control channel (PDCCH), a physical downlink shared channel (PDSCH), or a physical broadcast channel (PBCH), and the DL reference signal comprises at least one of: a synchronization signal block (SSB), a channel state information reference signal (CSI-RS), a demodulation reference signal (DMRS), or a positioning reference signal (PRS).

4. The method according to claim 1, wherein the UL transmission comprises at least one of a UL channel or a UL reference signal, the UL channel comprises at least one of: a physical uplink shared channel (PUSCH), a physical uplink control channel (PUCCH), or a physical random access channel (PRACH), and the UL reference signal comprises at least one of: a sounding reference signal (SRS), or a demodulation reference signal (DMRS).

5. The method according to claim 1, wherein different component carriers corresponding to the DCI and at least one of the UL transmission or the DL transmission comprise:

different component carriers corresponding to different serving cells, or different component carriers corresponding to serving cells and non-serving cells.

6. A method for beam application, performed by a network device, the method comprising:

sending downlink control information (DCI) to a terminal device, wherein the DCI comprises a unified transmission configuration indication (TCI) state; and applying a beam according to the DCI;

wherein the DCI is configured to determine at least one of a beam application time for uplink (UL) transmission or a beam application time for downlink (DL) transmission corresponding to the unified TCI state;

wherein at least one of the beam application time for UL transmission or the beam application time for DL transmission is after a transmission time of a hybrid automatic repeat request (HARQ) acknowledgment character (ACK) feedback for the DCI, with a plurality of symbols therebetween;

wherein when the DCI and at least one of the UL transmission or the DL transmission correspond to a component carrier of a same carrier; or the DCI and at least one of the UL transmission or the DL transmission correspond to component carriers of different carriers, and a subcarrier space (SCS) corresponding to the DCI is greater than or equal to at least one of a SCS of the UL transmission or a SCS of the DL transmission, the plurality of symbols are at least one of:

a first number of symbols determined based on the SCS of the DL transmission, wherein the beam application time is the beam application time for DL transmission;

a second number of symbols determined based on the SCS of the UL transmission, wherein the beam application time is the beam application time for UL transmission; or a third number of symbols determined based on the SCS of the UL transmission or the SCS of the DL transmission, wherein the beam application time is the beam application time for UL transmission and DL transmission.

7. A network device, comprising:

a processor; and a memory storing computer programs executable by the processor, wherein the processor is configured to perform the method according to claim 6.

8. A terminal device, comprising:

a processor; and a memory storing computer programs executable by the processor, wherein the processor is configured to:

receive downlink control information (DCI) from a network device, wherein the DCI comprises a unified transmission configuration indication (TCI) state; and determine at least one of a beam application time for uplink (UL) transmission or a beam application time for downlink (DL) transmission corresponding to the unified TCI state;

wherein the at least one of the beam application time for UL transmission or the beam application time for DL transmission is after a transmission time of a hybrid automatic repeat request (HARQ) acknowledgment character (ACK) feedback for the DCI, with a plurality of symbols therebetween;

wherein when the DCI and at least one of the UL transmission or the DL transmission correspond to a component carrier of a same carrier; or the DCI and at least one of the UL transmission or the DL transmission correspond to component carriers of different carriers, and a subcarrier space (SCS) corresponding to the DCI is greater than or equal to at least one of a SCS of the UL transmission or a SCS of the DL transmission, the plurality of symbols are at least one of:

a first number of symbols determined based on the SCS of the DL transmission, wherein the beam application time is the beam application time for DL transmission;

a second number of symbols determined based on the SCS of the UL transmission, wherein the beam application time is the beam application time for UL transmission; or a third number of symbols determined based on the SCS of the UL transmission or the SCS of the DL transmission, wherein the beam application time is the beam application time for UL transmission and DL transmission.

9. The terminal device according to claim 8, wherein when the DCI and at least one of the UL transmission or the DL transmission correspond to component carriers of different carriers, and the SCS corresponding to the DCI is smaller than at least one of the SCS of the UL transmission or the SCS of the DL transmission, the plurality of symbols comprise at least one of:

a fourth number of symbols and a fifth number of symbols, wherein the fourth number of symbols are determined based on the SCS of the DL transmission, the fifth number of symbols are determined based on a SCS of the DCI and the SCS of the DL transmission, and the beam application time is the beam application time for DL transmission;

a sixth number of symbols and a seventh number of symbols, wherein the sixth number of symbols are determined based on the SCS of the UL transmission, the seventh number of symbols are determined based on a SCS of the DCI and a SCS of the UL transmission, and the beam application time is the beam application time for UL transmission; or an eighth number of symbols and a ninth number of symbols, wherein the eighth number of symbols are determined based on the SCS of the UL transmission, the ninth number of symbols are determined based on a SCS of the DCI and the SCS of the UL transmission; or the eighth number of symbols are determined based on the SCS of the DL transmission, the ninth number of symbols are determined based on a SCS of the DCI and the SCS of the DL transmission; wherein the beam application time is the beam application time for UL transmission and DL transmission.

10. The terminal device according to claim 8, wherein the DL transmission comprises at least one of a DL channel or a DL reference signal, the DL channel comprises at least one of: a physical downlink control channel (PDCCH), a physical downlink shared channel (PDSCH), or a physical broadcast channel (PBCH), and the DL reference signal comprises at least one of: a synchronization signal block (SSB), a channel state information reference signal (CSI-RS), a demodulation reference signal (DMRS), or a positioning reference signal (PRS).

11. The terminal device according to claim 8, wherein the UL transmission comprises at least one of a UL channel or a UL reference signal, the UL channel comprises at least one of: a physical uplink shared channel (PUSCH), a physical uplink control channel (PUCCH), or a physical random access channel (PRACH), and the UL reference signal comprises at least one of: a sounding reference signal (SRS), or a demodulation reference signal (DMRS).

* * * * *